(12) United States Patent
Das et al.

(10) Patent No.: US 8,359,344 B2
(45) Date of Patent: Jan. 22, 2013

(54) AUTOMATIC LINKING OF POINTS OF INTEREST FOR INDOOR LOCATION BASED SEARCHING

(75) Inventors: Saumitra Mohan Das, San Jose, CA (US); Rajarshi Gupta, Sunnyvale, CA (US); Behrooz Khorashadi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 12/814,367

(22) Filed: Jun. 11, 2010

(65) Prior Publication Data

US 2011/0179027 A1 Jul. 21, 2011

Related U.S. Application Data

(60) Provisional application No. 61/297,177, filed on Jan. 21, 2010.

(51) Int. Cl.
*G06F 17/30* (2006.01)

(52) U.S. Cl. ........ 707/918; 707/706; 707/707; 707/769; 707/770; 707/812; 707/919; 707/920; 707/921; 715/810

(58) Field of Classification Search .......... 707/706–707, 707/769–770, 812, 918–921; 715/810
See application file for complete search history.

(56) References Cited

U.S. PATENT DOCUMENTS

| | | | |
|---|---|---|---|
| 2008/0134088 A1* | 6/2008 | Tse et al. | 715/810 |
| 2009/0177486 A1* | 7/2009 | Irish et al. | 705/1 |
| 2010/0042611 A1* | 2/2010 | Cruzada | 707/5 |
| 2011/0093515 A1* | 4/2011 | Albanese | 707/812 |
| 2011/0137730 A1* | 6/2011 | McCarney et al. | 705/14.58 |
| 2011/0137881 A1* | 6/2011 | Cheng et al. | 707/706 |
| 2012/0023088 A1* | 1/2012 | Cheng et al. | 707/707 |

OTHER PUBLICATIONS

Birgit Elias et al., "Pedestrian Navigation—Creating a tailored geodatabase for routing", Mar. 1, 2007, Positioning, Navigation and Communication, 2007. WPNC '07. 4th Wo Rkshop on, IEEE, PI, pp. 41-47, XP031080615, ISBN: 978-1-4244-0870-2.
International Search Report and Written Opinion—PCT/US2011/022123, International Search Authority—European Patent Office—Apr. 8, 2011.

* cited by examiner

*Primary Examiner* — Frantz Coby
(74) *Attorney, Agent, or Firm* — Arnold J. Gum

(57) ABSTRACT

A database of the location based relationships of points of interest within an environment is automatically generated using a digital representation of the environment that includes the points of interest at different locations within the environment. The locations of the points of interest in the environment are identified and the location based relationships between the points of interest are determined. The points of interest are labeled with the determined relationships and the points of interest and labeled relationships are stored. For example, a graph structure may be produced where each node is a point of interest and the edges between nodes is labeled with the determined relationships.

32 Claims, 3 Drawing Sheets

AUTOMATIC LINKING OF POINTS OF INTEREST FOR INDOOR LOCATION BASED SEARCHING

CROSS REFERENCE TO RELATED APPLICATION

This application claims the benefit of Provisional Application No. 61/297,177, filed Jan. 21, 2010, which is incorporated by reference herein in its entirety.

BACKGROUND

Indoor location based searching (LBS) mapping systems typically consist of many points of interest. Typically the points of interest are obtained from independent layers in facility drawings and have no relationship to each other. However, relationships between points of interest can be very useful for contextual search applications, which is one of the primary applications of indoor LBS. An example of such an application is a search for a printer that is near a coffee machine or to determine the location of a particular person's office. In conventional mapping systems, however, items such as printers and coffee machines, or individual's names and room numbers are stored in different layers without relationship to each other. Accordingly, improvements of LBS mapping systems are desirable.

SUMMARY

A database of the location based relationships of points of interest within an environment is automatically generated using a digital representation of the environment that includes the points of interest at different locations within the environment. The points of interest may be provided as one or more separate files with the points of interest indexed to locations within the environment. The locations of the points of interest in the environment are identified and the location based relationships between the points of interest are determined. For example, relationships between points of interest such as being in the same room, nearby, on the same floor, or within a specific walking distance may be identified. The points of interest are labeled with the determined relationships and the points of interest and labeled relationships are stored. For example, a graph structure may be produced where each node is a point of interest and the edges between nodes is labeled with the determined relationships.

DETAILED DESCRIPTION

Figure 1:
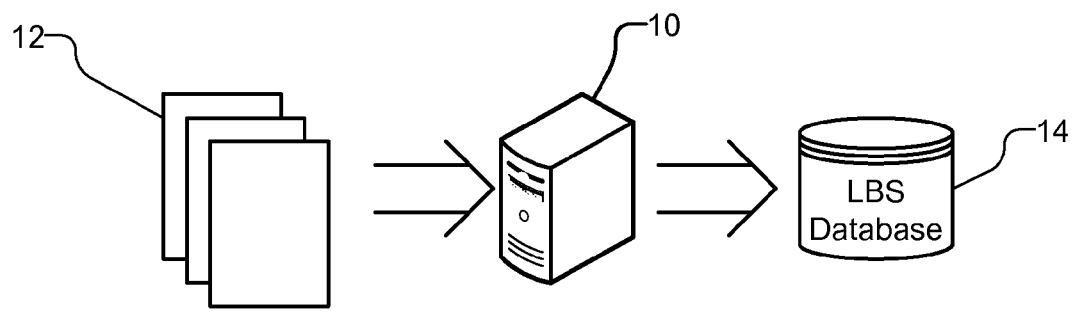
FIG. 1 is a block diagram of a computer system that automatically classifies relationships between points of interest within an environment and produces a database to be used in location based searches.

FIG. 1 is a block diagram of a computer system 10 that automatically classifies relationships between points of interest (POIs) within an environment and produces a database to be used in location based searches. A digital representation of the environment, along with the POIs, is provided to the computer system 10 in the form of one or more digital files 12. By way of example, the digital files 12 may be a CAD (Computer Aided Design) file for the environment or other similar digital representation, while the POI's may be provided as, e.g., one or more lists that index the POIs with reference to rooms or locations in the environment. The computer system 10 determines the relationships between the POIs with respect to their locations in the environment and outputs a representation of the POIs and their relationships that is stored in a database 14. By way of example, the representation of the POIs and their relationships may be output as a graph structure.

Figure 2:
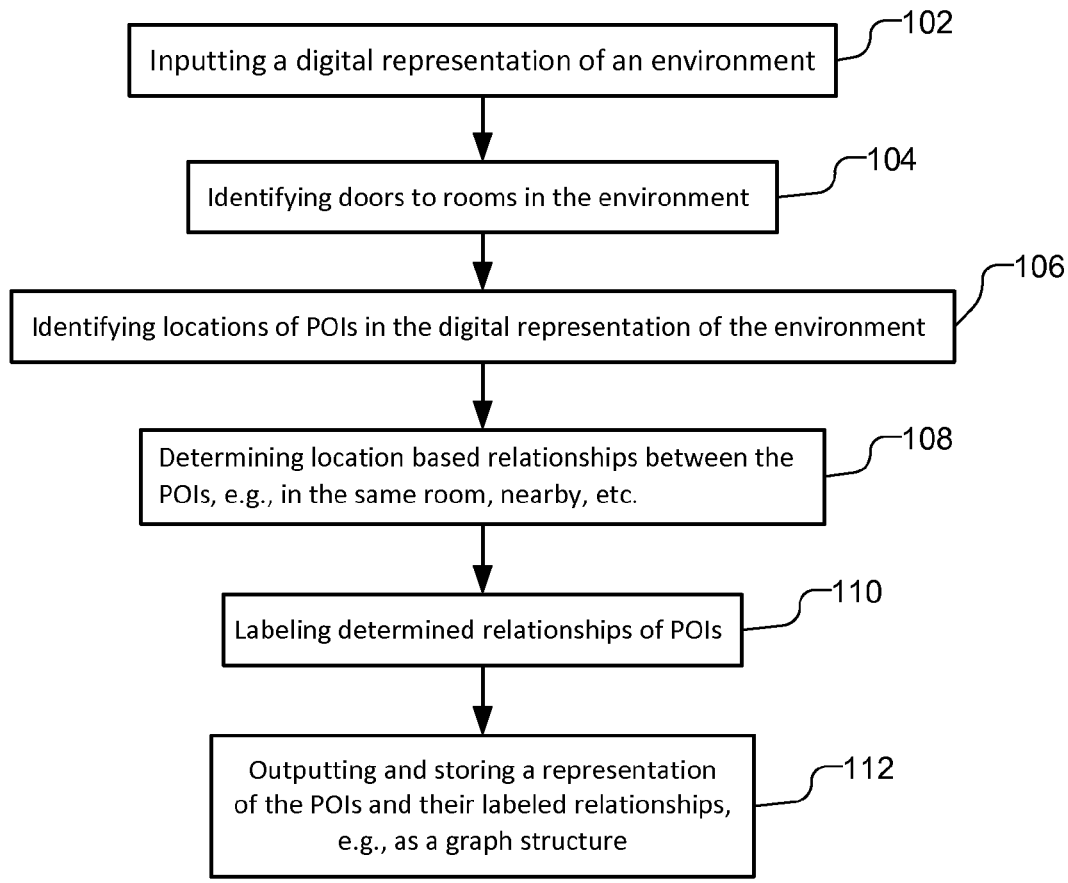
FIG. 2 is a flow chart illustrating a method of automatically classifying relationships between points of interest and creating a database for location based searches.

FIG. 2 is a flow chart illustrating a method of automatically classifying relationships between POIs and creating a database for location based searches. As illustrated, a digital representation of the environment is provided (102), e.g., by inputting the representation into the computer system 10. The digital representation of the environment may be input as a CAD or other electronic formats. The digital representation of the environment includes searchable POIs at different locations within the environment. The digital information with respect to the POIs may be provided as part of the CAD or other electronic formats as well as in separate digital files that index the POIs with reference to rooms or locations in the environment. For example, POIs may be provided as an IT (information technology) list of computers, networking devices, peripherals or any similar units that are desired to be searchable. POIs in the form of people may be provided as a list that includes personnel indexed to rooms or locations, such as an occupancy list from a human resources department. Office equipment, such as cafeteria related machines, copy machines, facsimile machines, office supplies, mail drops, etc. may be provided as POIs in the form of equipment inventories indexed to rooms or locations in the environment. It should be understood that the discussed POIs are provided for exemplary purposes and that additional or different types of POIs may be used if desired. The POIs are provided as a list or disconnected components in the digital representation. The relationships of the POIs in the environment (if any) may need to be determined based on these disconnected components and obtained via an analysis of the digital representation.

Figure 3:
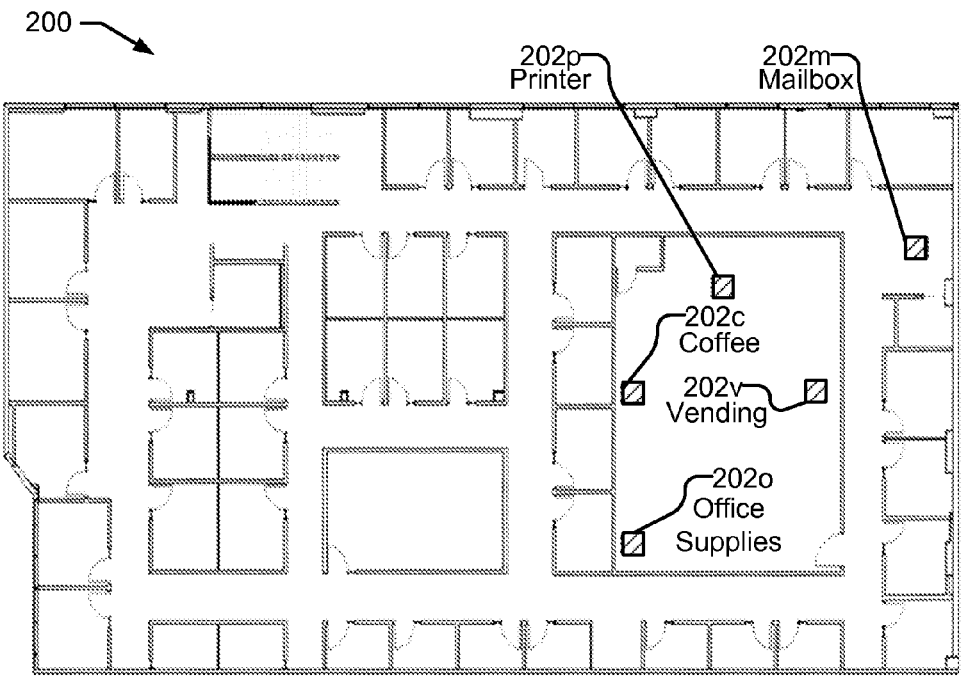
FIG. 3 illustrates a graphical representation of an environment with points of interest that may be provided in the form of a digital representation in one or more files.

FIG. 3 illustrates a graphical representation of an environment 200 that may be input in the form of a digital representation in one or more files. Environment 200, for the sake of example, is an office space that includes several points of interest (POIs) including a printer 202*p*, coffee machine 202*c*, vending machine 202*v*, office supplies 202*o*, and mailbox 202*m*, sometimes collectively referred to as POIs 202, which are illustrated in FIG. 3 in their respective locations within environment 200.

Figure 4:
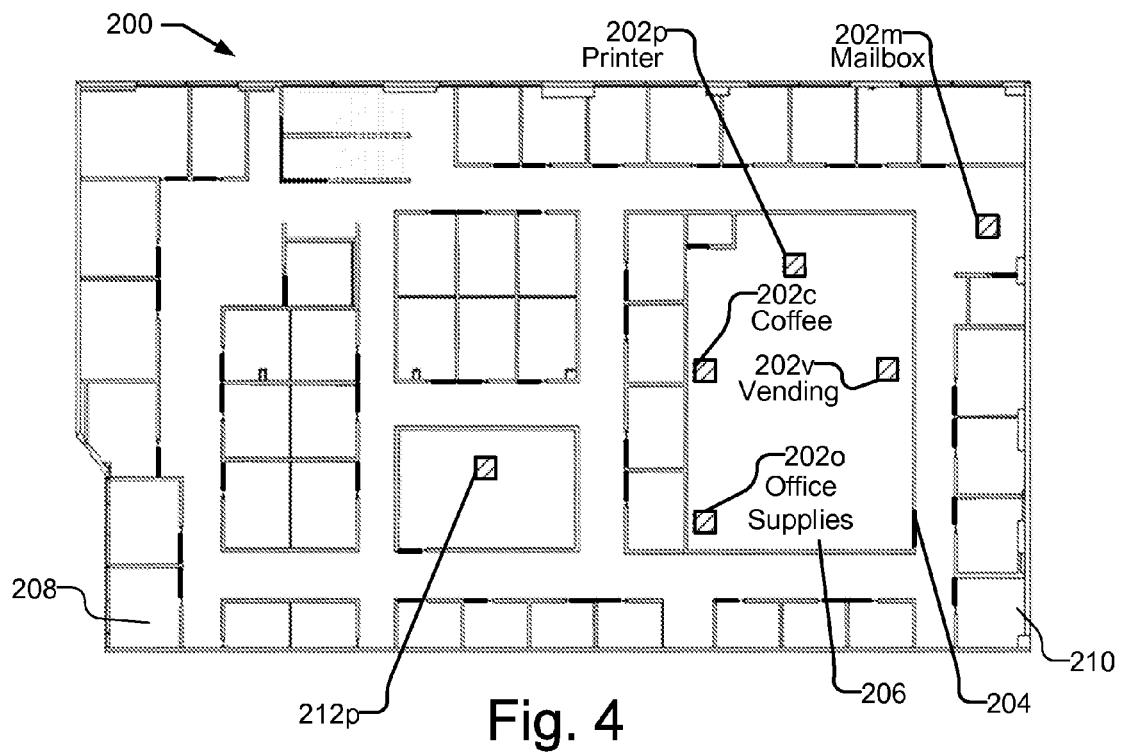
FIG. 4 illustrates the environment from FIG. 3 with doors in the environment identified and represented as closed so that rooms in the environment can be identified.

Referring back to FIG. 2, closed structures, such as rooms, within the environment are identified (104). Closed structures may be identified by first identifying all door structures in the environment. For example, a fine grained grid may be overlaid on the representation of the environment and points with edges that do not intersect walls in the environment are connected to produce a disconnected representation of the environment. FIG. 4, by way of example, illustrates the environment 200 with the doors in the environment identified and represented as closed. With the doors in the environment 200 closed, the rooms within the environment can be easily identified as separated locations within the environment. For example, with door 204 closed, room 206 with the printer 202p, coffee machine 202c, vending machine 202v, and office supplies 202o in the environment 104 can be identified.

Referring back to FIG. 2, the location of the POIs within the digital representation of the environment are identified (106). The location of the POIs may be identified as a coordinate in the environment or as, e.g., a room number or other similar position identifier. The location based relationships between the POIs in the environment is determined (108). For example, the POIs having locations in the same room can then be determined and POIs having locations that are not within the same room can be determined POIs are within the same closed structures, i.e., are not physically separated by a door, can be classified as being "in the same room" and POIs that are not within the same closed structures may be classified as "not in the same room" or "on the same floor" or other similar classification. Additional or alternative relationships between the POIs may be identified if desired. For example, POIs may be classified based on their proximity or more particularly based on their proximity as a function of walking time through the environment. POIs that are less than 15 seconds walking time (or any other desired distance) from each other (and not in the same room) may be classified as "nearby". For example, the walking distance between two POIs may be determined using the digital representation of the environment, where the path is not allowed to pass through walls in the environment. The walking distance, or equivalently the walking time based on an average walking speed, is compared to one or more thresholds to determine the appropriate label for the two POIs. If desired, multiple proximity classifications may be used to identify the relationship between two POIs. As can be seen in FIG. 4, the printer 202p, coffee machine 202c, vending machine 202v, and office supplies 202o will be identified as being in the same room 206, while mailbox 202m will be identified as being nearby to those POIs as mailbox 202m is a short walk from those POIs.

Moreover, it should be understood that a POI may be a location, such as a room number, in the environment, as opposed to an object in the environment. Thus, it may be determined that a first POI is in the same "room" as a second POI, where the second POI is the room number. Accordingly, the first POI may be identified as being inside the second POI, or in Room Number "X". Thus, one of the POI layers may be used to name a disconnected component in a graph and then other POIs are associated with that name.

Another relationship that may be identified for specific types of POIs is "nearest". Thus, every POI in the environment (or a subset of the POIs, such as only rooms) may be linked to the "nearest" of specific types of POIs, such as printers, bathrooms, or coffee machines. To determine the "nearest" classification, the distance between a POI and every POI of the desired type, e.g., printers, in the environment is determined and compared, where the shortest distance is identified as the "nearest". FIG. 4 by way of example, illustrates two rooms 208 and 210 and two printers 202p and 212p. The distance between room 208 and printer 212p is smaller than the distance between room 208 and printer 202p and thus, printer 212p is identified as the "nearest" printer for room 208, and similarly printer 202p is identified as the "nearest" printer for room 210.

The POIs are labeled with the determined relationships (110) and the representation of the POIs and their labeled relationships are output from the computer and stored, e.g., in a database (112). The representation of the POIs and their labeled relationships may be output, e.g., as a graph structure if desired.

Figure 5:
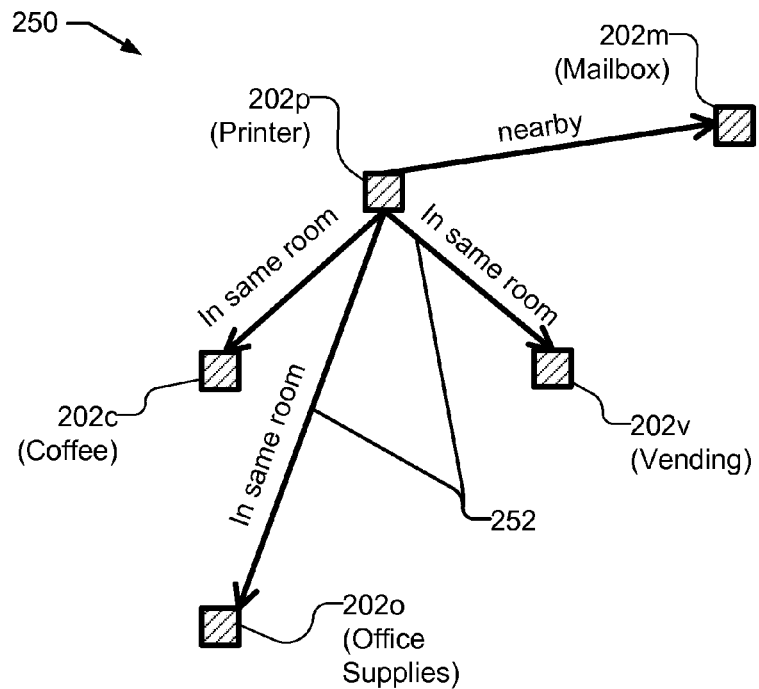
FIG. 5 illustrates a graph structure for points of interest within the environment from FIG. 3.

FIG. 5, by way of example, illustrates a graph structure 250 for POIs 202 from environment 200. As can be seen, each node in the graph structure 250 is a POI 202 and the edges 252 between the POIs are annotated with the identified relationship between any of the POIs. For the sake of simplicity, only the edges between the printer POI 202p and the other POIs are illustrated in FIG. 5. As can seen, the mailbox 202m is identified as being nearby the printer 202p because the mailbox 202m is not in the same room, but is within a short walk from the printer 202p through the environment 200.

Figure 6:
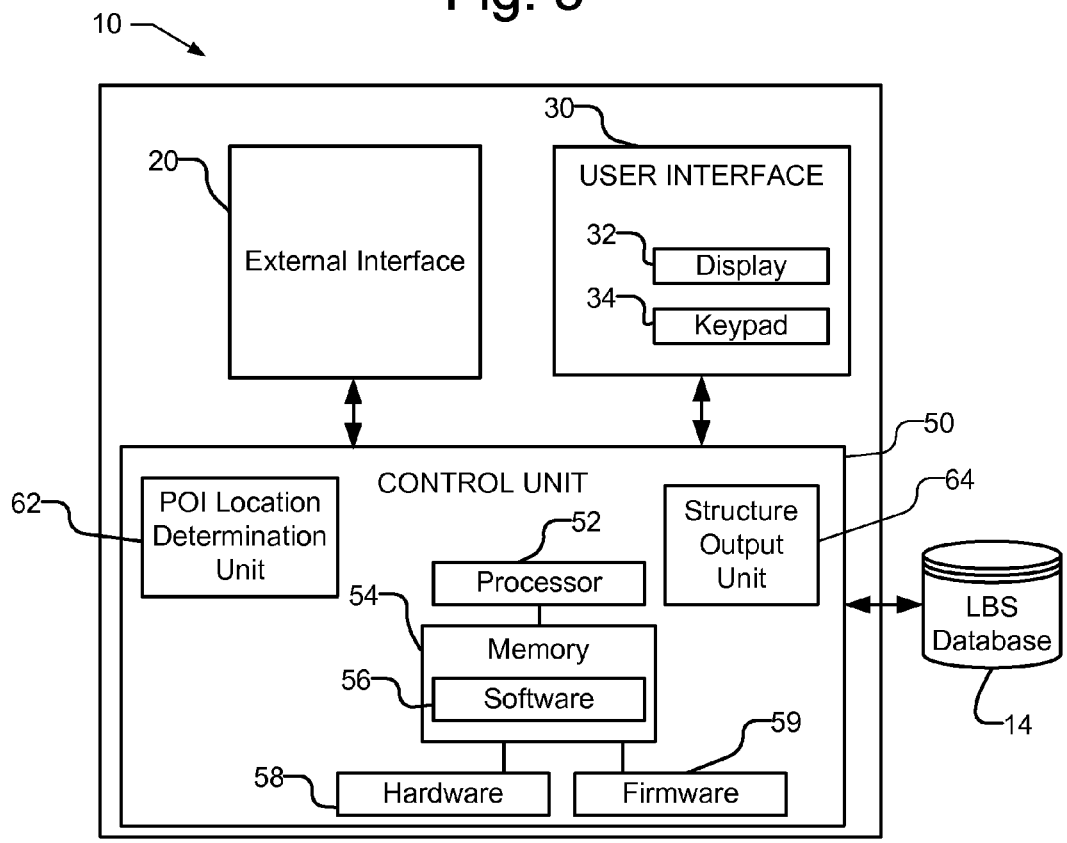
FIG. 6 is a block diagram of a computer system that automatically classifies relationships between points of interest within an environment and stores the resulting relationships in a database as described in the flow chart of FIG. 2.

FIG. 6 is a block diagram of a computer system 10 that automatically classifies relationships between points of interest (POIs) within an environment and stores the resulting relationships in a database 14 as described in the flow chart of FIG. 2. Computer system 10 includes an external interface 20 for receiving digital representation of the environment 200 including the POIs indexed to location within the environment 200. The external interface 20 may be a CD/DVD drive, a wired communication interface, e.g., for sending and receiving signals via Ethernet or any other wired format, a wireless interface, or any other appropriate interface for receiving digital files. The computer system 10 further includes a user interface 30 that includes, e.g., a display 32 and a keypad 34 or other input device through which the user can input information into the computer system 10.

The computer system 10 includes a control unit 50 that is connected to and communicates with the external interface 20 and the user interface 30. The control unit 50 accepts and processes data from the external interface 20 and the user interface 30 and controls the operation of those devices. The control unit 50 may be provided by a processor 52 and associated memory 54, software 56, as well as hardware 58 and firmware 59 if desired. The control unit 50 includes a POI location determination unit 62 and a structure output unit 64, which are illustrated as separate from the processor 52 for clarity, but may be within the processor 52. It will be understood as used herein that the processor 52 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in software 56, hardware 58, firmware 59 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 54 and executed by the processor 52. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 56 codes may be stored in memory 54 and executed by the processor 52 and may be used to run the processor and to control the operation of the computer system 10 as described herein. A program code stored in a computer-readable medium, such as memory 54, may include program code to identify locations of points of interest in an environment from a digital representation of the environment; program code to determine location based relationships between the points of interest in the environment; program code to label the location based relationship of points of interest in the environment; and program code to store the points of interest and the labeled location based relationships. Additionally, the computer readable medium may include program code to identify rooms in the environment from the digital representation of the environment and program code to determine points of interest having locations within a same room and points of interest having locations that are not within a same room. The computer readable medium may include program code to output a graph structure with nodes representing the points of interest and edges between the nodes annotated with the labeled location based relationships between the points of interest to be stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   inputting a digital representation of an environment into a processor, the digital representation including points of interest at different locations within the environment;
   identifying the locations of the points of interest in the environment;
   determining location based relationships between the points of interest in the environment;
   labeling the location based relationships of the points of interest in the environment to produce labeled location based relationships; and
   storing the points of interest and the labeled location based relationships.

2. The method of claim 1, wherein inputting the digital representation of the environment comprises inputting into the processor the points of interest indexed with reference to the locations in the environment.

3. The method of claim 1, wherein the digital representation of the environment includes identification of rooms that are disconnected from each other by doors, wherein determining location based relationships between the points of interest in the environment comprises determining the points of interest having locations within a same room and determining the points of interest having locations that are not within a same room, and wherein labeling the location based relationships of the points of interest in the environment comprises labeling the relationships of the points of interest that have locations within the same room and that have locations that are not within the same room.

4. The method of claim 3, further comprising identifying doors to rooms in the digital representation of the environment and wherein determining the points of interest having locations within the same room comprises determining the points of interest that are not separated by a door.

5. The method of claim 1, wherein determining location based relationships between the points of interest in the environment comprises identifying the points of interest within a predetermined distance from one another and wherein labeling the location based relationships of the points of interest in the environment, labels the points of interest based on the predetermined distance.

6. The method of claim 5, wherein the predetermined distance is related to time to walk from one point of interest to another.

7. The method of claim 1, wherein determining location based relationships between the points of interest in the environment comprises identifying distances between a first point of interest and a plurality of points of interest of a same type and comparing the distances to identify a shortest distance between the first point of interest and a second point of interest out of the plurality of points of interest and wherein labeling the location based relationships of the points of interest in the environment, labels the relationship between the first point of interest and the second point of interest based on the shortest distance.

8. The method of claim 1, wherein storing the points of interest and the labeled location based relationships comprises outputting from the processor a graph structure with nodes representing the points of interest and edges between the nodes annotated with the labeled location based relationships between the points of interest.

9. The method of claim 1, wherein the points of interest include room numbers in the environment.

10. An apparatus comprising:
    an external interface for receiving a digital representation of an environment, the digital representation including points of interest at different locations within the environment;
    a processor connected to the external interface;
    memory connected to the processor; and
    software held in the memory and run in the processor to cause the processor to identify the locations of the points of interest in the environment from the digital representation of the environment; determine location based relationships between the points of interest in the environment; label the location based relationships of the points of interest in the environment to produce labeled location based relationships; and store the points of interest and the labeled location based relationships.

11. The apparatus of claim 10, wherein the digital representation of the environment includes the points of interest indexed with reference to the locations in the environment.

12. The apparatus of claim 10, wherein the software run in the processor causes the processor to identify rooms in the environment from the digital representation of the environment, determine the points of interest having locations within a same room and the points of interest having locations that are not within a same room, and label the points of interest with locations within the same room and locations that are not within the same room.

13. The apparatus of claim 12, wherein the software run in the processor causes the processor to identify doors to rooms in the digital representation of the environment and determine the points of interest that are not separated by a door to determine the points of interest having locations within the same room.

14. The apparatus of claim 10, wherein the software run in the processor causes the processor to determine location based relationships between the points of interest in the environment by identifying the points of interest within a predetermined distance from one another and label the points of interest based on the predetermined distance.

15. The apparatus of claim 14, wherein the predetermined distance is related to time to walk from one point of interest to another.

16. The apparatus of claim 10, the software run in the processor causes the processor to determine location based relationships between the points of interest in the environment by identifying distances between a first point of interest and a plurality of points of interest of a type and comparing the distances to identify a shortest distance between the first point of interest and a second point of interest out of the plurality of points of interest and label the location based relationships for the first point of interest and the second point of interest based on the shortest distance.

17. The apparatus of claim 10, wherein the software run in the processor causes the processor to output a graph structure with nodes representing the points of interest and edges between the nodes annotated with the labeled location based relationships between the points of interest to be stored.

18. The apparatus of claim 10, wherein the points of interest include room numbers in the environment.

19. A system for generating a database of location based relationships of points of interest within an environment, the system comprising:
    means for receiving a digital representation of the environment including points of interest at different locations within the environment;
    means for identifying the locations of the points of interest in the environment;
    means for determining location based relationships between the points of interest in the environment;
    means for labeling the location based relationships of the points of interest in the environment to produce labeled location based relationships; and
    means for storing the points of interest and the labeled location based relationships.

20. The system of claim 19, the digital representation of the environment includes identification of rooms that are disconnected from each other by doors, wherein the means for determining location based relationships between the points of interest in the environment determines the points of interest having locations within a same room and the points of interest having locations that are not within a same room, and the means for labeling the location based relationships of the points of interest in the environment, labels the relationships of the points of interest that have locations within the same room and that have locations that are not within the same room.

21. The system of claim 19, wherein the means for determining location based relationships between the points of interest in the environment identifies the points of interest within a predetermined distance from one another and the means for labeling the location based relationships of the points of interest in the environment, labels the points of interest based on the predetermined distance.

22. The system of claim 21, wherein the predetermined distance is related to time to walk from one point of interest to another.

23. The system of claim 19, wherein the means for determining location based relationships between the points of interest in the environment identifies distances between a first point of interest and a plurality of points of interest of a same type and compares the distances to identify a shortest distance between the first point of interest and a second point of interest out of the plurality of points of interest, and the means for labeling the location based relationships of the points of interest in the environment, labels the first point of interest and the second point of interest based on the shortest distance.

24. The system of claim 19, wherein the means for storing the points of interest and the labeled location based relationships outputs a graph structure with nodes representing the points of interest and edges between the nodes annotated with the labeled location based relationships between the points of interest.

25. The system of claim 19, wherein the points of interest include room numbers in the environment.

26. A computer-readable medium including program code stored thereon, comprising:
    program code to identify locations of points of interest in an environment from a digital representation of the environment;
    program code to determine location based relationships between the points of interest in the environment;
    program code to label the location based relationships of the points of interest in the environment to produce labeled location based relationships; and
    program code to store the points of interest and the labeled location based relationships.

27. The computer-readable medium of claim 26, further comprising program code to identify rooms in the environment from the digital representation of the environment, program code to determine the points of interest having locations within a same room and the points of interest having locations that are not within a same room.

28. The computer-readable medium of claim 26, wherein the program code to determine location based relationships between the points of interest in the environment identifies the points of interest within a predetermined distance from one another and the program code to label the location based relationships of the points of interest in the environment, labels the points of interest based on the predetermined distance.

29. The computer-readable medium of claim 28, wherein the predetermined distance is related to time to walk from one point of interest to another.

30. The computer-readable medium of claim 26, wherein the program code to determine location based relationships between the points of interest in the environment identifies distances between a first point of interest and a plurality of the points of interest of a same type and compares the distances to identify a shortest distance between the first point of interest and a second point of interest out of the plurality of points of interest and the program code to label the location based relationships of the points of interest in the environment, labels the first point of interest and the second point of interest based on the shortest distance.

31. The computer-readable medium of claim 26, further comprising program code to output a graph structure with nodes representing the points of interest and edges between the nodes annotated with the labeled location based relationships between the points of interest to be stored.

32. The computer-readable medium of claim 26, wherein the points of interest include room numbers in the environment.

* * * * *